(12) United States Patent
Machii

(10) Patent No.: US 12,475,556 B2
(45) Date of Patent: Nov. 18, 2025

(54) IMAGE PROCESSING DEVICE, IMAGE PROCESSING METHOD, AND IMAGE PROCESSING PROGRAM

(71) Applicant: FUJIFILM Corporation, Tokyo (JP)

(72) Inventor: Yusuke Machii, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 469 days.

(21) Appl. No.: 18/066,807

(22) Filed: Dec. 15, 2022

(65) Prior Publication Data

US 2023/0196565 A1    Jun. 22, 2023

(30) Foreign Application Priority Data

Dec. 16, 2021 (JP) .................. 2021-204580

(51) Int. Cl.
G06K 9/00 (2022.01)
A61B 6/00 (2006.01)
A61B 6/50 (2024.01)
G06T 7/00 (2017.01)
G06T 7/62 (2017.01)
G06V 10/20 (2022.01)

(52) U.S. Cl.
CPC ............ *G06T 7/0012* (2013.01); *A61B 6/502* (2013.01); *A61B 6/5217* (2013.01); *G06T 7/62* (2017.01); *G06V 10/255* (2022.01); *G06T 2207/30068* (2013.01); *G06T 2207/30088* (2013.01)

(58) Field of Classification Search
CPC .............. G06K 9/00; A61B 5/726; G06T 7/00
USPC ........ 382/100, 103, 106–107, 128–134, 154, 382/162, 168, 173, 181, 189, 219, 224, 382/254, 276, 286–291, 305; 378/6, 21, 378/28, 46
See application file for complete search history.

(56) References Cited

U.S. PATENT DOCUMENTS

2001/0031076 A1* 10/2001 Campanini ............ G16H 50/20
                                                        382/128
2005/0074155 A1*  4/2005 Alyassin ............... G06T 11/008
                                                        382/154

(Continued)

FOREIGN PATENT DOCUMENTS

JP    2004-222784 A    8/2004
JP    2004-254742 A    9/2004

(Continued)

OTHER PUBLICATIONS

Calcification in Human Intracranial Aneurysms Is Highly Prevalent and Displays Both Atherosclerotic and Nonatherosclerotic Types, Piyusha S. Gade, Riikka Tulamo, (Year: 2019).*

(Continued)

*Primary Examiner* — Seyed H Azarian
(74) *Attorney, Agent, or Firm* — Studebaker Brackett PLLC

(57) ABSTRACT

Provided are an image processing device, an image processing method, and an image processing program that can easily determine a distribution of a faint calcification having low visible in a radiographic image.
An image processing device includes at least one processor. The processor detects a faint calcification from a radiographic image captured by irradiating a breast with radiation and displays a calcification distribution image showing a distribution of the faint calcification in the breast in the radiographic image.

17 Claims, 6 Drawing Sheets

(56) References Cited

U.S. PATENT DOCUMENTS

| | | | |
|---|---|---|---|
| 2007/0211930 A1* | 9/2007 | Dolwick | A61B 6/502 |
| | | | 382/132 |
| 2009/0080752 A1* | 3/2009 | Ruth | A61B 6/12 |
| | | | 382/132 |
| 2011/0103673 A1* | 5/2011 | Rosenstengel | G06T 7/0012 |
| | | | 382/132 |
| 2017/0200267 A1 | 7/2017 | Hashimoto | |
| 2018/0047303 A1* | 2/2018 | Groenewald | A61B 6/583 |
| 2020/0082532 A1* | 3/2020 | Khalil | A61B 5/726 |
| 2020/0380670 A1 | 12/2020 | Kamei et al. | |

FOREIGN PATENT DOCUMENTS

| | | |
|---|---|---|
| JP | 2005-080757 A | 3/2005 |
| JP | 2006-325640 A | 12/2006 |
| JP | 2009-136457 A | 6/2009 |
| JP | 2016-022143 A | 2/2016 |
| JP | 2018-161405 A | 10/2018 |

OTHER PUBLICATIONS

Endo et al., "Breast imaging Lexicon", Journal of Japan Association of Breast Cancer Screening, 1998, vol. 7, Issue 1, pp. 63-70.

An Office Action; "Notice of Reasons for Refusal," mailed by the Japanese Patent Office on Jun. 17, 2025, which corresponds to Japanese Patent Application No. 2021-204580 and is related to U.S. Appl. No. 18/066,807; with English language translation.

Bougioukos P. et al., "Fuzzy C-means-driven FHCE contextual segmentation method for mammographic microcalcification detection", The Imaging Science Journal, vol. 58, No. 3, pp. 146-154, Jun. 1, 2010, doi: 10.1179/136821909X12581187860095.

H. Boulehmia et al., "New CAD System for Breast Microcalcifications Diagnosis", International Journal of Advanced Computer Science and Applications, vol. 7, No. 4, pp. 133-143, Jan. 1, 2016, SAI Organization.

Ted C. Wang et al., "Detection of Microcalcifications in Digital Mammograms Using Wavelets", IEEE Transactions on Medical Imaging, vol. 17, No. 4, pp. 498-509, Aug. 1, 1998, IEEE.

Roee Zamir et al., "Segmenting Microcalcifications in Mammograms and its Applications", arXiv.org, Cornell University Library, Ithaca, NY, Feb. 1, 2021, 8 pages.

Lee S-K et al., "A computer-aided design mammography screening system for detection and classification of microcalcifications", International Journal of Medical Informatics, vol. 60, No. 1, pp. 29-57, Oct. 1, 2000, Elsevier.

Coakley K. S. et al., "Classification of equivocal mammograms through digital analysis", The Breast, vol. 3, No. 4, Dec. 1, 1994, pp. 222-226, doi: 10.1016/0960-9776(94)90050-7.

Hossain Shamim, "Microc alcification Segmentation Using Modified U-net Segmentation Network from Mammogram Images", Journal of King Saud University—Computer and Information Sciences, vol. 34, No. 2, pp. 86-94, Feb. 1, 2022, Elsevier on behalf of King Saud University.

The extended European search report issued by the European Patent Office on May 9, 2023, which corresponds to European Patent Application No. 22212887.8-1210 and is related to U.S. Appl. No. 18/066,807.

* cited by examiner

FIG.3
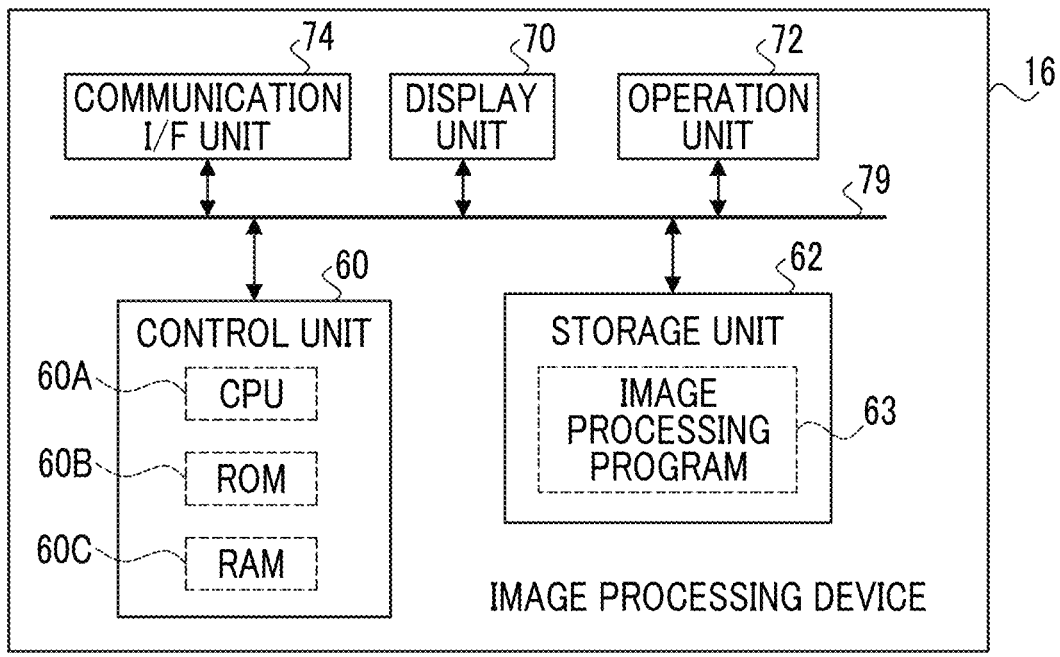
FIG.4
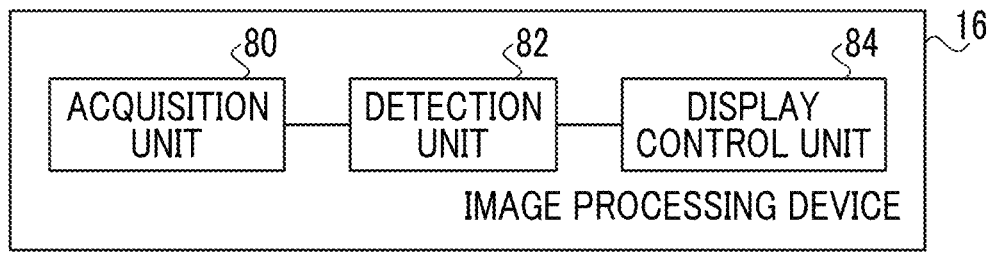
FIG.5
| DISTRIBUTION<br>MORPHOLOGY | DIFFUSE<br>/SCATTERED | REGIONAL | GROUPED | LINEAR | SEGMENTAL |
|---|---|---|---|---|---|
| SMALL ROUND | CATEGORY 2 | | CATEGORY 3 OR 4 | | |
| FAINT | | | | | |
| PLEOMORPHIC<br>/HETEROGENEOUS | CATEGORY 3 | | CATEGORY 4 | CATEGORY 5 | |
| FINE LINEAR<br>/FINE BRANCHING | CATEGORY 5 | | | | |

IMAGE PROCESSING DEVICE, IMAGE PROCESSING METHOD, AND IMAGE PROCESSING PROGRAM

CROSS-REFERENCE TO RELATED APPLICATIONS

This application is based on and claims priority under 35 USC 119 from Japanese Patent Application No. 2021-204580 filed on Dec. 16, 2021, the disclosure of which is incorporated herein by reference in its entirety.

TECHNICAL FIELD

The present disclosure relates to an image processing device, an image processing method, and an image processing program.

RELATED ART

Calcifications are interpreted in a radiographic image captured by irradiating a breast with radiation. Therefore, a technique for assisting the interpretation of calcifications is known. For example, JP2018-161405A discloses a technique that enables intuitive determination of a portion in which a mammary gland region and a small calcification region overlap each other. In addition, JP2016-22143A discloses a technique that enables intuitive understanding of a dense state of small calcifications.

However, the distribution of calcifications is an important criterion in a case in which a category of a tumor is determined in interpretation. There are calcifications which are entirely clearly visible and calcifications which appear only amorphous as an image. However, it is preferable to consider information of these calcifications as much as possible in the interpretation. However, many of the faint calcifications are small in size and have low visibility. Therefore, it is difficult to determine the distribution of the faint calcifications in the techniques disclosed in JP2018-161405A and JP2016-22143A.

SUMMARY

The present disclosure has been made in view of the above circumstances, and an object of the present disclosure is to provide an image processing device, an image processing method, and an image processing program that make it easy to determine a distribution of faint calcifications having low visibility in a radiographic image.

In order to achieve the above object, according to a first aspect of the present disclosure, there is provided an image processing device comprising at least one processor. The processor detects a faint calcification from a radiographic image captured by irradiating a breast with radiation and displays a calcification distribution image showing a distribution of the faint calcification in the breast in the radiographic image.

According to a second aspect of the present disclosure, in the image processing device according to the first aspect, the faint calcification may be a calcification having a diameter equal to or less than 0.24 mm.

According to a third aspect of the present disclosure, in the image processing device according to the first or second aspect, the calcification distribution image may be a gray scale image or a binary image.

According to a fourth aspect of the present disclosure, in the image processing device according to any one of the first to third aspects, the processor may detect a small calcification from the radiographic image and display the detected small calcification on the calcification distribution image.

According to a fifth aspect of the present disclosure, in the image processing device according to any one of the first to fourth aspects, a diameter of the faint calcification may be smaller than a diameter of the small calcification.

According to a sixth aspect of the present disclosure, in the image processing device according to the fourth aspect, the small calcification may be a calcification having a diameter that is greater than 0.24 mm and equal to or less than 1.00 mm.

According to a seventh aspect of the present disclosure, in the image processing device according to any one of the first to sixth aspects, the processor may detect at least one of a skin line or a nipple of the breast from the radiographic image and display the detected at least one of the skin line or the nipple on the calcification distribution image.

According to an eighth aspect of the present disclosure, in the image processing device according to any one of the first to sixth aspects, the processor may detect a skin line and a nipple of the breast from the radiographic image, generate a plurality of pseudo-mammary gland lines indicating a mammary gland structure of the breast in a pseudo manner on the basis of the detected skin line and nipple, and display the pseudo-mammary gland lines on the calcification distribution image.

According to a ninth aspect of the present disclosure, in the image processing device according to any one of the first to eighth aspects, the processor may determine a shape of the calcification from the radiographic image and display a determination result on the calcification distribution image.

In addition, in order to achieve the above-described object, according to a tenth aspect of the present disclosure, there is provided an image processing method executed by a computer. The image processing method comprises: detecting a faint calcification from a radiographic image captured by irradiating a breast with radiation; and displaying a calcification distribution image showing a distribution of the faint calcification in the breast in the radiographic image.

Further, in order to achieve the above-described object, according to an eleventh aspect of the present disclosure, there is provided an image processing program that causes a computer to execute a process comprising: detecting a faint calcification from a radiographic image captured by irradiating a breast with radiation; and displaying a calcification distribution image showing a distribution of the faint calcification in the breast in the radiographic image.

According to the present disclosure, it is possible to easily determine a distribution of faint calcifications having low visibility in a radiographic image.

BRIEF DESCRIPTION OF THE DRAWINGS

FIG. 3 is a block diagram illustrating an example of a configuration of an image processing device according to the embodiment.

FIG. 4 is a functional block diagram illustrating an example of the configuration of the image processing device according to the embodiment.

FIG. 5 is a diagram illustrating the classifications and types of calcifications.

DETAILED DESCRIPTION

Hereinafter, an embodiment of the present disclosure will be described in detail with reference to the drawings. In addition, this embodiment does not limit the present disclosure.

Figure 1:
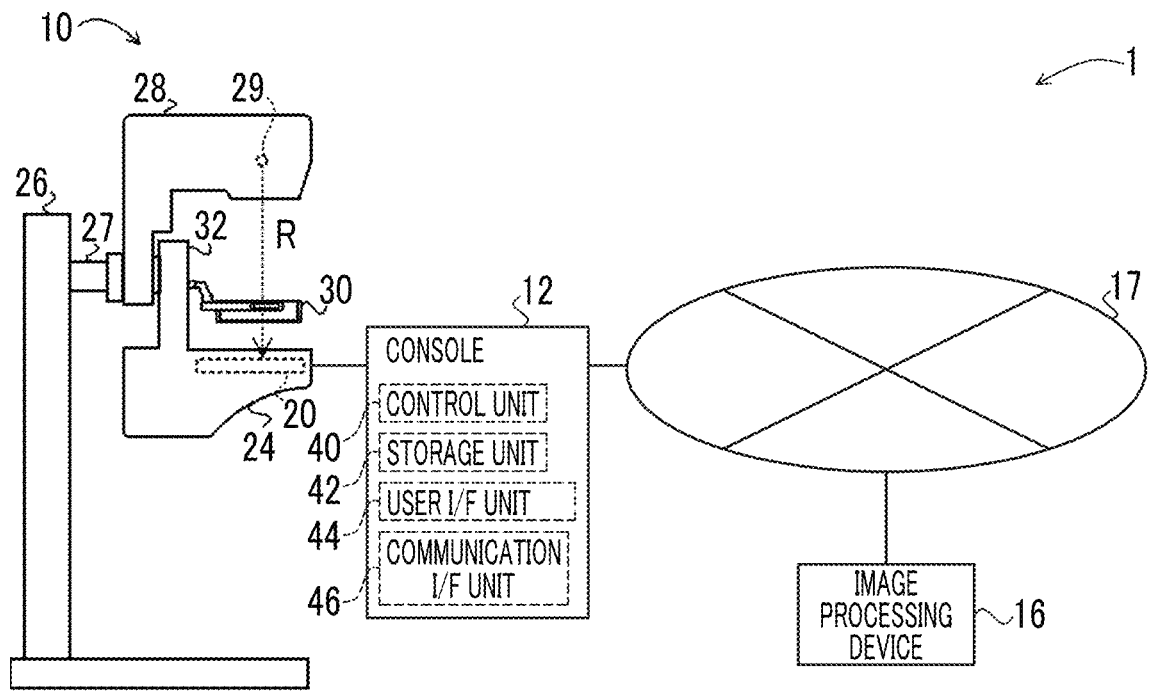
FIG. 1 is a schematic diagram illustrating an example of an overall configuration of a radiography system according to an embodiment.

First, an example of an overall configuration of a radiography system according to this embodiment will be described. FIG. 1 is a diagram illustrating an example of the overall configuration of a radiography system 1 according to this embodiment. As illustrated in FIG. 1, the radiography system 1 according to this embodiment comprises a mammography apparatus 10, a console 12, and an image processing device 16. The console 12 and the image processing device 16 are connected by wired communication or wireless communication through a network 17.

First, the mammography apparatus 10 according to this embodiment will be described. FIG. 1 is a side view illustrating an example of the outward appearance of the mammography apparatus 10 according to this embodiment. In addition, FIG. 1 illustrates an example of the outward appearance of the mammography apparatus 10 as viewed from a left side of a subject.

The mammography apparatus 10 according to this embodiment is an apparatus that is operated under the control of the console 12 and irradiates a breast of the subject as an object with radiation R (for example, X-rays) emitted from a radiation source 29 to capture a radiographic image of the breast. Further, the mammography apparatus 10 according to this embodiment has a function of performing normal imaging that captures images at an irradiation position where the radiation source 29 is disposed along a normal direction to a detection surface 20A of a radiation detector 20 and so-called tomosynthesis imaging (which will be described in detail below) that captures images while moving the radiation source 29 to each of a plurality of irradiation positions.

As illustrated in FIG. 1, the mammography apparatus 10 comprises an imaging table 24, a base 26, an arm portion 28, and a compression unit 32.

Figure 2:
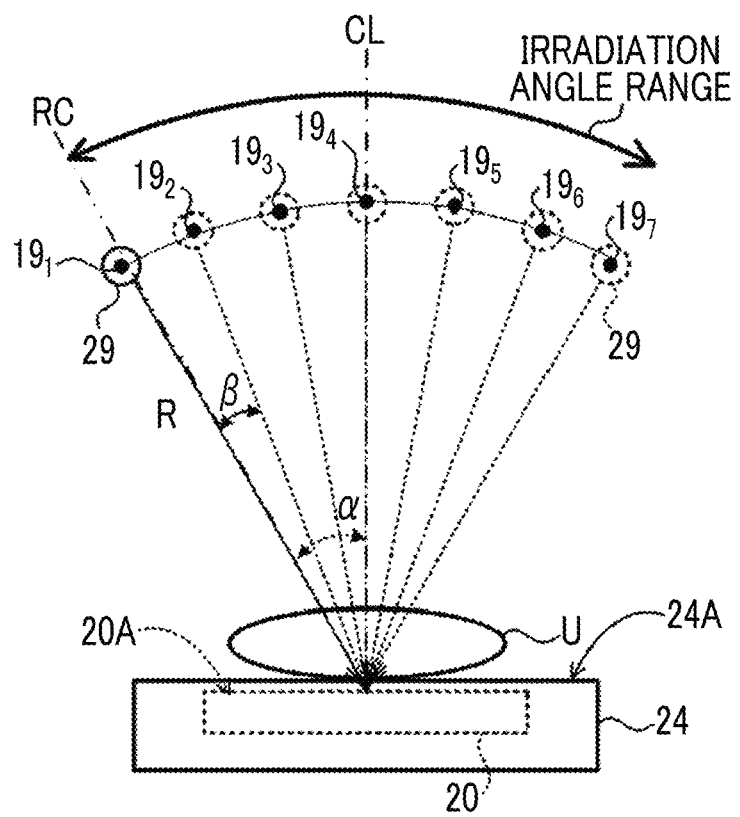
FIG. 2 is a diagram illustrating an example of tomosynthesis imaging.

The radiation detector 20 is disposed in the imaging table 24. As illustrated in FIG. 2, in the mammography apparatus 10 according to this embodiment, in a case in which imaging is performed, a breast U of the subject is positioned on an imaging surface 24A of the imaging table 24 by a user.

The radiation detector 20 detects the radiation R transmitted through the breast U which is the object. Specifically, the radiation detector 20 detects the radiation R that has entered the breast U of the subject and the imaging table 24 and that has reached the detection surface 20A of the radiation detector 20, generates a radiographic image on the basis of the detected radiation R, and outputs image data indicating the generated radiographic image. In the following description, in some cases, a series of operations of emitting the radiation R from the radiation source 29 and generating a radiographic image using the radiation detector 20 is referred to as "imaging". The type of the radiation detector 20 according to this embodiment is not particularly limited. For example, the radiation detector 20 may be an indirect-conversion-type radiation detector that converts the radiation R into light and converts the converted light into charge or may be a direct-conversion-type radiation detector that directly converts the radiation R into charge.

A compression plate 30 used for compressing the breast during imaging is attached to the compression unit 32 provided on the imaging table 24 and is moved in a direction (hereinafter, referred to as an "up-down direction") toward or away from the imaging table 24 by a compression plate driving unit (not illustrated) that is provided in the compression unit 32. The compression plate 30 is moved in the up-down direction to compress the breast of the subject between the imaging table 24 and the compression plate 30.

The arm portion 28 can be rotated with respect to the base 26 by a shaft portion 27. The shaft portion 27 is fixed to the base 26, and the shaft portion 27 and the arm portion 28 are rotated integrally. Gears are provided in each of the shaft portion 27 and the compression unit 32 of the imaging table 24. The gears can be switched between an engaged state and a non-engaged state to switch between a state in which the compression unit 32 of the imaging table 24 and the shaft portion 27 are connected and rotated integrally and a state in which the shaft portion 27 is separated from the imaging table 24 and runs idle. In addition, components for switching between the transmission and non-transmission of the power of the shaft portion 27 are not limited to the gears, and various mechanical elements may be used. Each of the arm portion 28 and the imaging table 24 can be relatively rotated with respect to the base 26, using the shaft portion 27 as a rotation axis.

In a case in which the tomosynthesis imaging is performed in the mammography apparatus 10, the radiation source 29 is sequentially moved to each of a plurality of irradiation positions having different irradiation angles by the rotation of the arm portion 28. The radiation source 29 includes a radiation tube (not illustrated) that generates the radiation R, and the radiation tube is moved to each of the plurality of irradiation positions according to the movement of the radiation source 29. FIG. 2 is a diagram illustrating an example of the tomosynthesis imaging. In addition, the compression plate 30 is not illustrated in FIG. 2. In this embodiment, as illustrated in FIG. 2, the radiation source 29 is moved to irradiation positions $19_t$ (t=1, 2, . . . ; the maximum value is 7 in FIG. 2) having different irradiation angles which are arranged at an interval of a predetermined angle β, that is, positions where the radiation R is emitted to the detection surface 20A of the radiation detector 20 at different angles. At each of the irradiation positions $19_t$, the radiation source 29 emits the radiation R to the breast U in response to an instruction from the console 12, and the radiation detector 20 captures a radiographic image. In the radiography system 1, in a case in which the tomosynthesis imaging that moves the radiation source 29 to each of the irradiation positions $19_t$ and captures radiographic images at each of the irradiation positions $19_t$ is performed, seven radiographic images are obtained in the example illustrated in FIG. 2. In addition, in the following description, in the tomosynthesis imaging, in a case in which a radiographic image captured at each irradiation position 19 is distinguished from other radiographic images, it is referred to as a "projection image". Further, in a case in which radiographic images, such as a projection image, a tomographic image which will be described below, and a normal two-dimensional image, are generically referred to regardless of the type, they are simply referred to as "radiographic images".

In addition, as illustrated in FIG. 2, the irradiation angle of the radiation R means an angle α formed between a normal line CL to the detection surface 20A of the radiation detector 20 and a radiation axis RC. The radiation axis RC means an axis that connects a focus of the radiation source 29 at each irradiation position 19 and a preset position such as a center of the detection surface 20A. Further, here, it is assumed that the detection surface 20A of the radiation detector 20 is substantially parallel to the imaging surface 24A.

Moreover, in a case in which the mammography apparatus 10 performs the normal imaging, the radiation source 29 remains at the irradiation position $19_t$ (the irradiation position $19_t$ along the normal direction; the irradiation position 194 in FIG. 2) where the irradiation angle α is 0 degrees. The radiation R is emitted from the radiation source 29 in response to an instruction from the console 12.

The mammography apparatus 10 and the console 12 are connected by wired communication or wireless communication. The radiographic image captured by the radiation detector 20 in the mammography apparatus 10 is output to the console 12 by wired communication or wireless communication through a communication interface (I/F) unit (not illustrated).

As illustrated in FIG. 1, the console 12 according to this embodiment comprises a control unit 40, a storage unit 42, a user I/F unit 44, and a communication I/F unit 46.

As described above, the control unit 40 of the console 12 has a function of controlling the capture of the radiographic image of the breast by the mammography apparatus 10. An example of the control unit 40 is a computer system comprising a central processing unit (CPU), a read only memory (ROM), and a random access memory (RAM).

The storage unit 42 has a function of storing, for example, information related to the capture of a radiographic image or the radiographic image acquired from the mammography apparatus 10. The storage unit 42 is a non-volatile storage unit and is, for example, a hard disk drive (HDD) or a solid state drive (SSD).

The user I/F unit 44 includes input devices, such as various buttons and switches operated by the user, such as a radiology technician, regarding the capture of a radiographic image and display devices, such as lamps and displays, that display information related to imaging and radiographic images.

The communication I/F unit 46 transmits and receives various kinds of data, such as information related to the capture of radiographic images and the radiographic images obtained by imaging, to and from the mammography apparatus 10 using wired communication or wireless communication. In addition, the communication I/F unit 46 transmits and receives various kinds of data, such as radiographic images, to and from the image processing device 16 through the network 17 using wired communication or wireless communication.

The image processing device 16 is used by a doctor or the like (hereinafter, simply referred to as a "doctor") to interpret a radiographic image. The image processing device 16 according to this embodiment has a function of detecting a faint calcification from the radiographic image and displaying a calcification distribution image indicating the faint calcification in the breast in the radiographic image. A faint calcification refers to calcification for which it is difficult to determine its morphology from its image due to its faintness or smallness (another example of which is an amorphous or indistinct calcification. See, for instance, Endo et al., "Breast imaging Lexicon", Journal of Japan Association of Breast Cancer Screening, 1998 Volume 7 Issue 1, Pages 63-70).

FIG. 3 is a block diagram illustrating an example of a configuration of the image processing device 16 according to this embodiment. As illustrated in FIG. 3, the image processing device 16 according to this embodiment comprises a control unit 60, a storage unit 62, a display unit 70, an operation unit 72, and a communication I/F unit 74. The control unit 60, the storage unit 62, the display unit 70, the operation unit 72, and the communication I/F unit 74 are connected to each other through a bus 79, such as a system bus or a control bus, such that they can transmit and receive various kinds of information.

The control unit 60 controls the overall operation of the image processing device 16. The control unit 60 comprises a CPU 60A, a ROM 60B, and a RAM 60C. Various programs and the like used by the CPU 60A for control are stored in the ROM 60B in advance. The RAM 60C temporarily stores various kinds of data.

The storage unit 62 is a non-volatile storage unit and is, for example, an HDD or an SSD. Various kinds of information including, for example, an image processing program 63 are stored in the storage unit 62.

The display unit 70 displays radiographic images or various kinds of information. The display unit 70 is not particularly limited, and various displays and the like may be used. In addition, the operation unit 72 is used by the user to input instructions for the diagnosis of a lesion of the breast using a radiographic image by the doctor, various kinds of information, or the like. The operation unit 72 is not particularly limited. Examples of the operation unit 72 include various switches, a touch panel, a touch pen, and a mouse. In addition, the display unit 70 and the operation unit 72 may be integrated into a touch panel display.

The communication I/F unit 74 transmits and receives various kinds of information to and from the console 12 through the network 17 using wireless communication or wired communication.

In addition, FIG. 4 is a functional block diagram illustrating an example of the configuration of the image processing device 16 according to this embodiment. As illustrated in FIG. 4, the image processing device 16 comprises an acquisition unit 80, a detection unit 82, and a display control unit 84. For example, in the image processing device 16 according to this embodiment, the CPU 60A of the control unit 60 executes the image processing program 63 stored in the storage unit 62 to function as the acquisition unit 80, the detection unit 82, and the display control unit 84.

The acquisition unit 80 has a function of acquiring the radiographic image of the breast captured by the mammography apparatus 10. Specifically, the acquisition unit 80 acquires image data indicating the radiographic image captured by the radiation detector 20 of the mammography apparatus 10 through the communication I/F unit 46 and the communication I/F unit 74. The acquisition unit 80 outputs the acquired radiographic image to the detection unit 82.

The detection unit 82 has a function of detecting a faint calcification in the breast from the radiographic image of the breast. For example, the detection unit 82 according to this embodiment detects only the faint calcification among a plurality of types of calcifications. In addition, the detection unit 82 generates a calcification distribution image showing a distribution of the faint calcifications in the breast in the radiographic image.

There are a plurality of types of calcifications observed by, for example, a doctor. For example, according to a mammography guideline, the calcifications observed from the radiographic images are divided into a typically benign calcification and a calcification that requires distinguishment between benignancy and malignancy. Examples of the typically benign calcification include a vascular calcification, a lucent-centered calcification, a milk-of-calcium calcification, and a suture calcification. Meanwhile, the calcifications that require the distinguishment between benignancy and malignancy are calcifications that do not belong to the typically benign calcifications and are mainly classified according to the morphology and distribution of calcifications as illustrated in FIG. 5. As the morphology of calcifications, the calcifications are classified into a "small round" calcification, an "amorphous" calcification, a "pleomorphic or heterogeneous" calcification, and a "fine linear or fine branching" calcification. The "small round" calcification is a calcification that has a circular shape of 1 mm or less or an elliptical shape and has an ill-defined margin (excluding an isolated calcification). In addition, the "small round" calcification is included in a small calcification in this embodiment. The "amorphous" calcification is mainly a circular or flake-like calcification. Most of the calcifications are small and amorphous. Since the calcification is amorphous, it is difficult to classify the morphology of the calcification, and the calcification tends to be difficult to see in the radiographic image. The "pleomorphic or heterogeneous" calcification is an irregular calcification having various sizes and densities and typically has a broken stone shape. In addition, the "fine linear or fine branching" calcification is an elongated irregular calcification and is generally recognized as a line. Meanwhile, as the distribution of the calcifications, the calcifications are classified into a "diffuse or scattered" calcification, a "regional" calcification, a "grouped" calcification, a "linear" calcification, and a "segmental" calcification. The "diffuse or scattered" calcification is a calcification that is scattered in the entire breast without having a constant distribution tendency. The "regional" calcification is a calcification that spreads over a wide area, but does not spread throughout the mammary gland. The "grouped" calcifications are multiple calcifications that are confined to a small area. The "linear" calcification is a calcification that is linearly arranged and may be branched. The "segmental" calcification is a calcification that is matched with a mammary ductal-lobular system and suggests that breast cancer is likely to spread to a glandular lobe or a segment.

In the mammography guideline, as illustrated in FIG. 5, categories are associated with the distribution and morphology of the calcifications. "Category 2" indicates a benign calcification, "Category 3" indicates a calcification which is benign, but whose malignancy is not capable of being denied, "Category 4" indicates a calcification that is suspected to be malignant, and "Category 5" indicates a malignant calcification.

The detection unit 82 detects the faint calcification in the morphology of the calcification. As an example of this embodiment, the detection unit 82 detects the faint calcification from the radiographic image using, for example, a rule-based calcification detection model. Specifically, the detection unit 82 sets a region of interest (ROI) for each pixel of the radiation detector and detects the calcification on the basis of a dispersion value $\sigma_{calc}^2$ derived for the ROI, using the following Expression (1):

$$\text{Threshold}_1 < \sigma_{calc}^2 \leq \text{Threshold}_2 \tag{1}$$

For a method for designing a threshold value in the above-described Expression (1), it is difficult to define a general-purpose threshold value of the dispersion value because the image quality of a mammogram differs depending on, for example, the specifications of the apparatus. In order to solve the above problem, in this embodiment, first, the faint calcification and the small calcification are defined on the basis of the diameters of the calcifications. The diameter of the faint calcification is smaller than the diameter of the small calcification. Specifically, the faint calcification and the small calcification are defined with reference to a reference value of an ACR phantom used for evaluating the image quality of mammography as follows:

Small calcification: 0.24 mm < diameter $\Phi \leq 1.00$ mm; and
Faint calcification: 0.16 mm ≤ diameter $\Phi \leq 0.24$ mm.

Threshold$_1$ and Threshold$_2$, which are the threshold values of the dispersion values capable of separating the small calcification and the faint calcification defined as described above and noise, are calculated for each apparatus, into which a computer aided diagnosis (CAD) is introduced, to set optimum threshold values for each apparatus.

In addition, in the present disclosure, the faint calcification is defined as a calcification whose morphology is difficult to determine, and the small calcification is defined as a calcification with a size that requires the distinguishment between benignancy and malignancy. The above-described physical values do not limit the technology of the present disclosure. The reason is that, since the size of the calcification that makes it difficult to determine the morphology or to distinguish between benignancy and malignancy differs depending on the apparatus, it is desirable to visually set the optimum physical values for each apparatus. In addition, criteria for determining "small" in the above-described "small round" calcification used for the determination of the category may be applied to the definition of the small calcification.

Further, Threshold$_1$ and Threshold$_2$ may be adjusted according to the amount of mammary glands. In a case in which the amount of mammary glands in the breast is large, the structures of the mammary glands overlap each other, which makes it difficult to see the mammary glands. Therefore, it is difficult to distinguish between the faint calcification and the small calcification. For this reason, in a case in which the amount of mammary glands in the breast is large, the value of Threshold$_2$ may be increased. Further, the method by which the detection unit 82 derives the amount of mammary glands from a radiographic image 90 is not particularly limited. Specifically, the detection unit 82 derives a mammary gland content indicating the content of the mammary glands in a thickness direction of the breast, which is the irradiation direction of the radiation R, as the amount of mammary glands for each pixel of the radiographic image 90. In a case in which there are no mammary glands and the breast consists of only fat, the mammary gland content is "0". As the value of mammary gland density becomes larger, the mammary gland content becomes larger.

For example, the detection unit 82 can derive the mammary gland content on the basis of the pixel values of a region that does not include the breast in the radiographic image 90, that is, a so-called blank region, the pixel values of pixels corresponding to fat, the pixel values of the pixels for which the mammary gland content is derived, and an average attenuation coefficient ratio between the mammary gland and fat (an average attenuation coefficient of the mammary gland/an average attenuation coefficient of fat).

Figure 6:
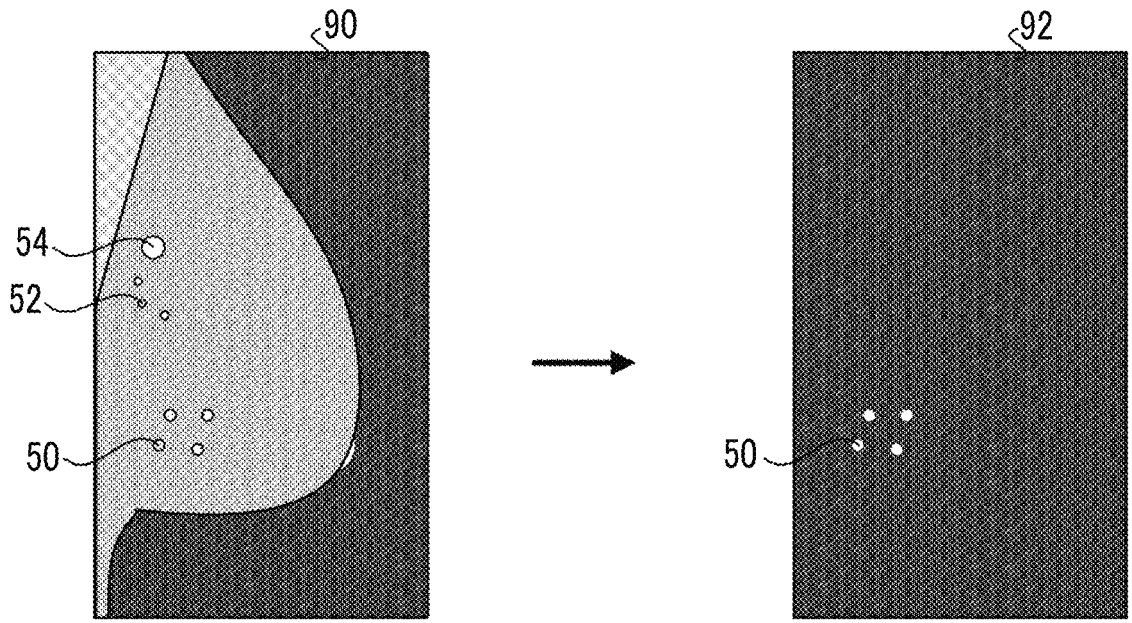
FIG. 6 is a diagram illustrating a calcification distribution image.

As illustrated in FIG. 6, the detection unit 82 generates a calcification distribution image 92 showing the distribution of the faint calcifications detected from the radiographic image 90 in this way. The breast of the radiographic image 90 includes a faint calcification 50, a small calcification 52, and the other calcification 54. The detection unit 82 detects only the faint calcification 50 among the faint calcification 50, the small calcification 52, and the other calcification 54 and generates the calcification distribution image 92. The calcification distribution image 92 is a black-and-white binary image in which the faint calcification is represented by "1" and the other region is represented by "0". As illustrated in FIG. 6, in the calcification distribution image 92, among the faint calcification 50, the small calcification 52, and the other calcification 54, only the faint calcification 50 is shown as a white image. In addition, the calcification distribution image 92 is not limited to the binary image and may be, for example, a gray scale image in which calcifications are shown stepwise from white to black.

Next, the operation of the image processing device 16 according to this embodiment will be described with reference to FIG. 7. The CPU 60A executes the image processing program 63 stored in the storage unit 62 such that image processing illustrated in FIG. 7 is performed.

Figure 7:
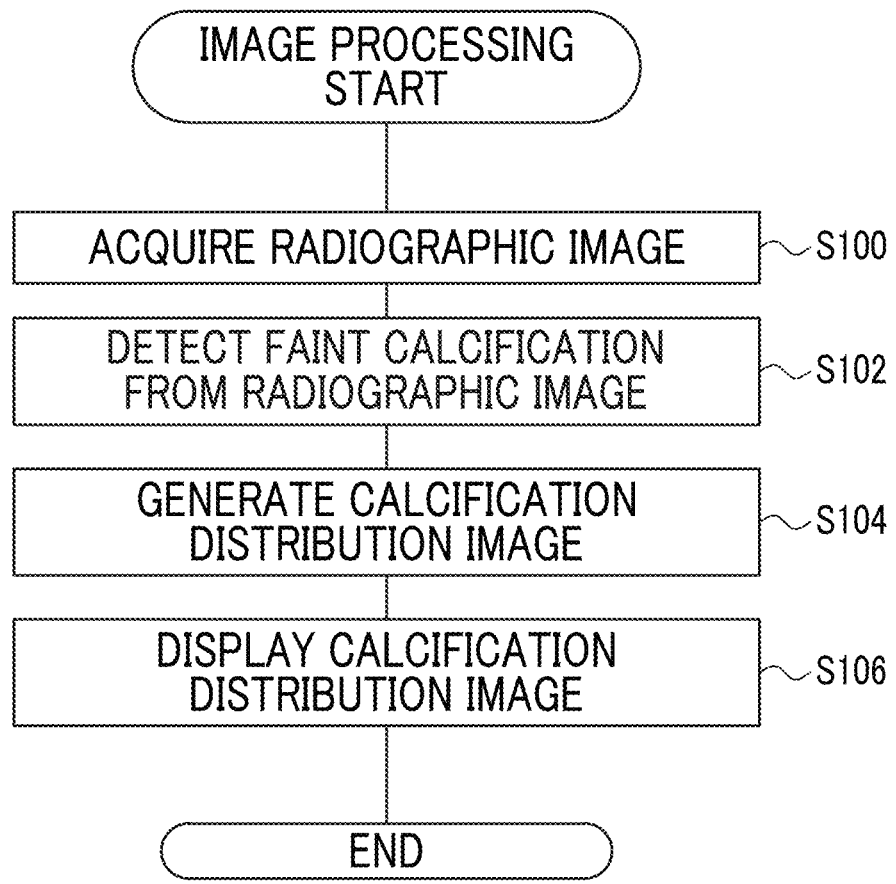
FIG. 7 is a flowchart illustrating an example of a flow of image processing by the image processing device according to the embodiment.

In Step S100 of FIG. 7, the acquisition unit 80 acquires the radiographic image 90 from the console 12 as described above. Further, in a case where the mammography apparatus 10 captures a pair of left and right breast radiographic images 90 of the subject, the pair of left and right radiographic images 90, that is, two radiographic images 90 are acquired.

Then, in Step S102, the detection unit 82 detects the faint calcification from the radiographic images 90 acquired in Step S100 as described above. As described above, the detection unit 82 sets the ROI for each pixel of the radiographic images 90 and detects the faint calcification on the basis of the dispersion value of the ROI. As described above, in a case in which the pair of left and right radiographic images 90 are acquired in Step S100, the faint calcification is detected from each of the pair of left and right radiographic images 90.

Then, in Step S104, the detection unit 82 generates the calcification distribution image 92 showing the distribution of the faint calcifications detected in Step S102. As described above, the detection unit 82 generates a binary image showing the faint calcification and the other region as the calcification distribution image 92. As described above, in a case in which the pair of left and right radiographic images 90 are acquired in Step S100, the calcification distribution image 92 is generated for each of the pair of left and right radiographic images 90.

Figure 8A:
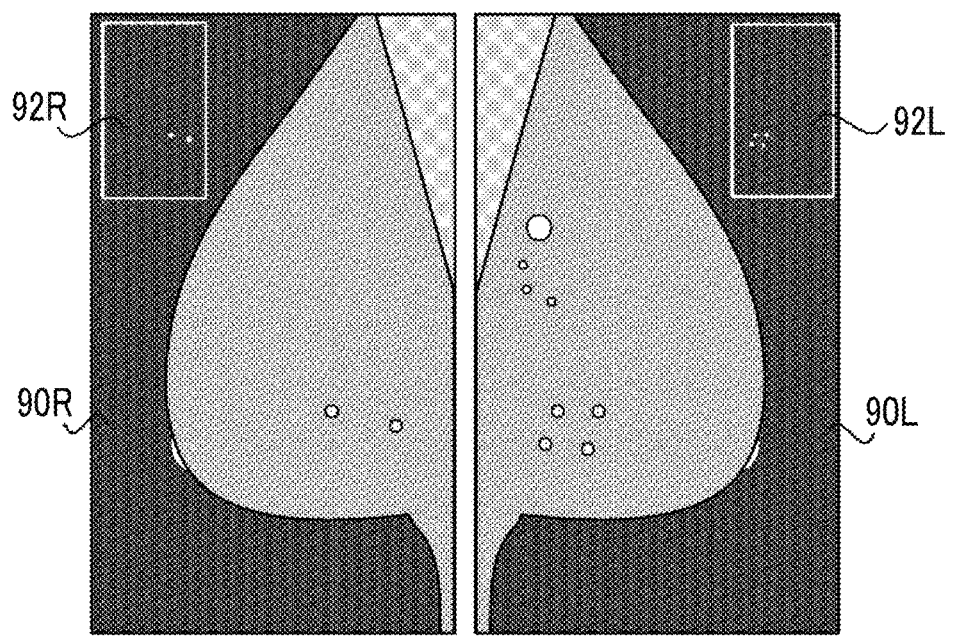
FIG. 8A is a diagram illustrating an example of a display aspect of the calcification distribution image.
Figure 8B:
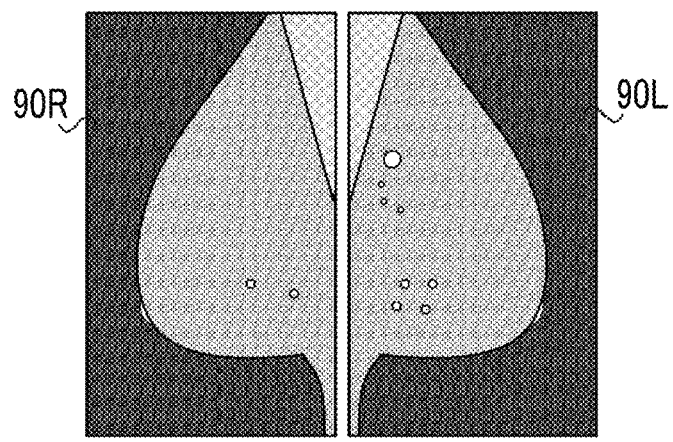
FIG. 8B is a diagram illustrating another example of the display aspect of the calcification distribution image.
Figure 8B:
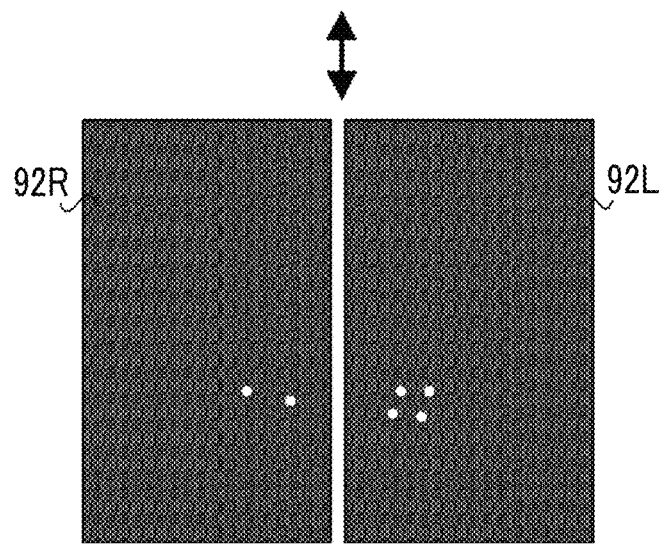

Then, in Step S106, the display control unit 84 performs control to display the calcification distribution image 92 generated in Step S104 on the display unit 70. In addition, the display aspect in which the display control unit 84 displays the calcification distribution image 92 on the display unit 70 is not particularly limited. For example, the calcification distribution image 92 and the corresponding radiographic image 90 may be displayed side by side on the display unit 70 or may be displayed to be switchable. FIGS. 8A and 8B illustrate an example of the display aspect of a radiographic image 90R of the right breast, a calcification distribution image 92R corresponding to the radiographic image 90R, a radiographic image 90L of the left breast, and a calcification distribution image 92L corresponding to the radiographic image 90L. In the example illustrated in FIG. 8A, the display control unit 84 displays the radiographic image 90R and the radiographic image 90L side by side. In addition, the display control unit 84 displays the calcification distribution image 92R to be superimposed on a region in which the breast is not included at the end of the radiographic image 90R, that is, a so-called blank region. Similarly, the display control unit 84 displays the calcification distribution image 92L to be superimposed on a region in which the breast is not included at the end of the radiographic image 90L, that is, a so-called blank region. On the other hand, in the example illustrated in FIG. 8B, the display control unit 84 switches a state in which the radiographic image 90R and the radiographic image 90L are displayed side by side and a state in which the calcification distribution image 92R and the calcification distribution image 92L are displayed side by side in response to a display switching instruction from the user input through the operation unit 72. This display of the radiographic image 90 and the calcification distribution image 92 makes it possible to easily determine the distribution state of the faint calcifications in the breast. In addition, the display of the left and right calcification distribution images 92L and 92R on the same screen makes it possible to easily recognize the difference in distribution between the left and right breasts.

In a case in which the process in Step S106 ends, the image processing illustrated in FIG. 7 ends.

In addition, the above-described embodiment is an example, and various modification examples can be made. For example, the following modification examples may be used.

Modification Example 1

In this modification example, a modification example of a method for detecting the faint calcification by the detection unit 82 will be described. The detection unit 82 according to the above-described embodiment detects the faint calcification from the radiographic image 90 using the rule-based calcification detection model. In contrast, the detection unit 82 according to this modification example detects the faint calcification from the radiographic image 90 using a learning-based calcification detection model.

Figure 9:
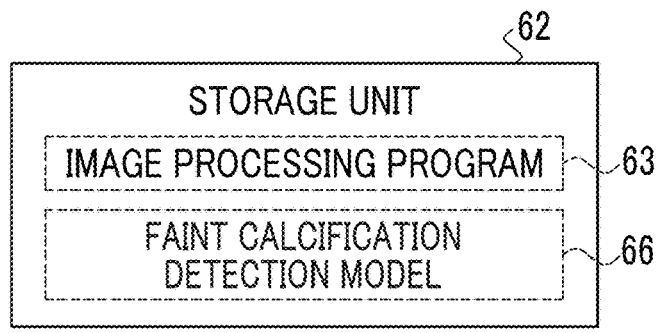
FIG. 9 is a diagram illustrating an example of a configuration of a storage unit of an image processing device according to Modification Example 1.

In this modification example, a trained model trained by machine learning to detect the faint calcification from the radiographic image 90 and to output the calcification distribution image 92 as a detection result is used as a faint calcification detection model. Therefore, as illustrated in FIG. 9, a faint calcification detection model 66 is further stored in the storage unit 22 of the image processing device 16 according to this modification example.

A model obtained by annotating the faint calcifications and performing machine learning on a model, such as a convolutional neural network (CNN), a U-shaped neural network (U-Net), or multilayer perceptron (MLP), can be used as the faint calcification detection model 66.

Figure 10:
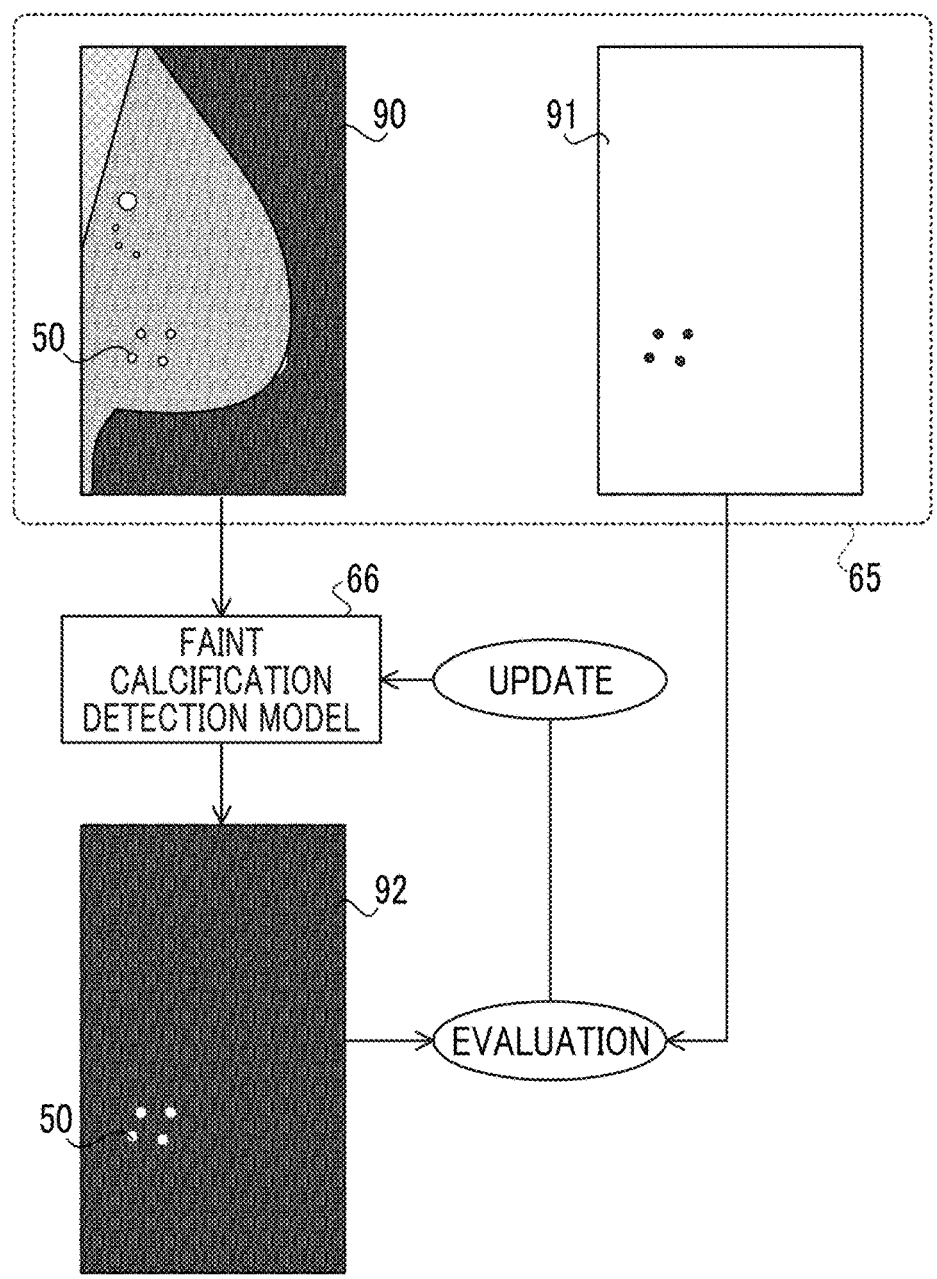
FIG. 10 is a diagram illustrating a learning phase of a faint calcification detection model in Modification Example 1.

As illustrated in FIG. 10, the faint calcification detection model 66 is subjected to machine learning with training data 65. A set of the radiographic image 90 and an annotation image 91 is used as the training data 65. In addition, the radiographic image 90 used as the training data 65 includes a radiographic image that does not include the faint calcification 50. The annotation image 91 is, for example, an image in which the faint calcification 50 has been manually annotated in advance. The annotation image 91 is an image for matching an answer with the calcification distribution image 92 output from the faint calcification detection model 66 according to the radiographic image 90 and is compared with the calcification distribution image 92. As the detection accuracy of the faint calcification 50 in the faint calcification detection model 66 becomes higher, the probability that the annotation image 91 and the calcification distribution image 92 will be matched with each other becomes higher.

In a learning phase of the faint calcification detection model 66, the radiographic image 90 is input to the faint calcification detection model 66. Then, the calcification distribution image 92 is output from the faint calcification detection model 66. The calcification distribution image 92 output from the faint calcification detection model 66 is compared with the annotation image 91 to evaluate the detection accuracy of the faint calcification 50 in the faint calcification detection model 66. The faint calcification detection model 66 is updated according to the evaluation result.

In the learning phase, the input of the radiographic image 90 to the faint calcification detection model 66, the output of the calcification distribution image 92 from the faint calcification detection model 66, the evaluation of the detection accuracy of the faint calcification detection model 66 by the comparison between the calcification distribution image 92 and the annotation image 91, and the update of the faint calcification detection model 66 are repeated while changing the set of the radiographic image 90 and the annotation image 91 until the detection accuracy of the faint calcification detection model 66 reaches a desired level.

In addition, for example, the image processing device 16 may train the faint calcification detection model 66. In addition, for example, an external learning device may train the faint calcification detection model 66, and the image processing device 16 may acquire the trained faint calcification detection model 66 from the external learning device.

Further, in this modification example, in Step S102 of the image processing (see FIG. 7) according to the above-described embodiment, the detection unit 82 inputs the radiographic image 90 to the faint calcification detection model 66 such that the faint calcification detection model 66 detects the faint calcification.

Then, in Step S104, the detection unit 82 acquires the calcification distribution image 92 output from the faint calcification detection model 66 to generate the calcification distribution image 92.

As described above, according to this modification example, the faint calcification is detected using the trained model trained by machine learning. Therefore, an appropriate model can be used to improve detection accuracy.

Modification Example 2

In this modification example, an aspect in which the small calcification is further detected will be described. As in the above-described embodiment, for example, the detection unit 82 according to this modification example detects the faint calcification and the small calcification from the radiographic image using, for example, the rule-based calcification detection model. Specifically, the detection unit 82 sets an ROI for each pixel of the radiation detector and detects the faint calcification and the small calcification, using the above-described Expression (1) and the following Expression (2), respectively, on the basis of a dispersion value $\sigma_{calc}^2$ derived for the ROI:

$$\text{Threshold}_2 < \sigma_{calc}^2 \leq \text{Threshold}_3 \qquad (2).$$

For a method for designing a threshold value in the above-described Expression (2), it is difficult to define a general-purpose threshold value of the dispersion value because the image quality of a mammogram differs depending on, for example, the specifications of the apparatus. Therefore, on the basis of the above-described definition for the faint calcification and the small calcification, $\text{Threshold}_1$ to $\text{Threshold}_5$, which are the threshold values of the dispersion values capable of separating the small calcification, the faint calcification, and noise, are calculated for each apparatus, into which CAD is introduced, to set optimum threshold values for each apparatus.

The detection unit 82 generates the calcification distribution image 92 showing the distribution of the faint calcification and the small calcification detected from the radiographic image 90 in this way. For example, the calcification distribution image 92 may be a black-and-white binary image in which the faint calcification and the small calcification are represented by "1" and the other region is represented by "0". Further, for example, the calcification distribution image 92 may be a gray scale image in which a value (brightness) corresponding to each of the faint calcification and the small calcification is different.

Figure 11:
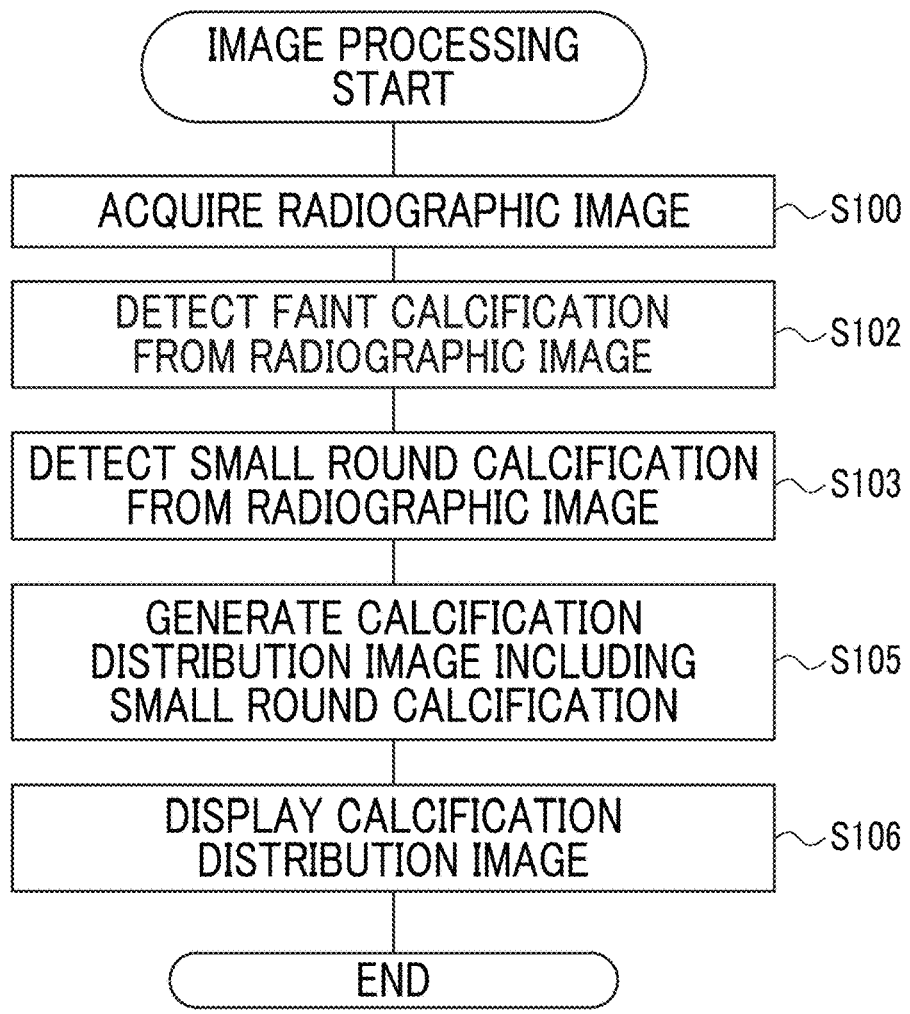
FIG. 11 is a flowchart illustrating an example of a flow of image processing by an image processing device according to Modification Example 2.

FIG. 11 is a flowchart illustrating an example of image processing according to this modification example. In the image processing illustrated in FIG. 11, in Step S103, the detection unit 82 detects the small calcification from the radiographic image 90 as described above. Then, in Step S105, the detection unit 82 generates the calcification distribution image 92 also including the small calcification as described above.

As described above, according to this modification example, it is possible to understand the distribution of even small calcifications.

As described above, in the image processing device 16 according to the above-described embodiment, the detection unit 82 detects the faint calcification from the radiographic image captured by irradiating the breast with radiation. In addition, the detection unit 82 displays the calcification distribution image 92 showing the distribution of the faint calcifications in the breast in the radiographic image.

As described above, in the above-described embodiment, the calcification distribution image 92 showing the distribution of the faint calcifications among a plurality of types of calcifications is generated and displayed. Therefore, it is possible to interpret the faint calcification without being disturbed by other types of calcifications including a typically benign calcification, tissues in the breast, and structures. As a result, it is possible to easily determine the distribution of the faint calcifications.

The benign calcification may be difficult to see in a binarized image or a gray scale image. Therefore, as in the above-described embodiment, the benign calcification is not displayed on the calcification distribution image 92 such that it is not obscured.

Therefore, according to the image processing device 16 of this embodiment, it is possible to easily determine the distribution of the faint calcifications having low visibility in the radiographic image 90.

Figure 12:
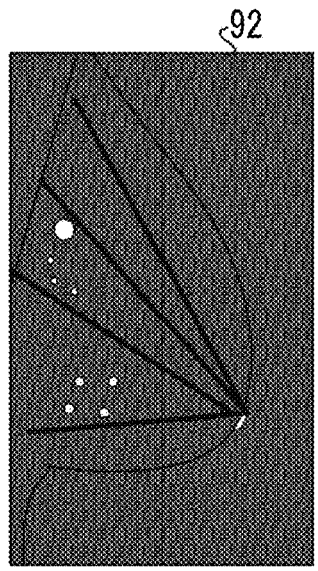
FIG. 12 is a diagram illustrating another example of the display aspect of the calcification distribution image.

In addition, as illustrated in FIG. 12, the skin line and nipple of the breast may be displayed on the calcification distribution image 92 in order to easily determine the distribution of calcifications. Further, a pseudo-mammary gland line indicating a pseudo-mammary gland may be displayed on the calcification distribution image 92 on the basis of the skin line and nipple of the breast. The display of these auxiliary lines on the calcification distribution image makes it possible to easily determine the distribution of calcifications. In addition, it is possible to make it easier to see the skin line, the nipple, and the mammary gland than in a case in which the actual skin line, nipple, and mammary gland are displayed.

Furthermore, in the above-described embodiment, for example, the following various processors can be used as the hardware structure of processing units performing various processes such as the acquisition unit 80, the detection unit 82, and the display control unit 84. The various processors include, for example, a programmable logic device (PLD), such as a field programmable gate array (FPGA), that is a processor whose circuit configuration can be changed after manufacture, and a dedicated electric circuit, such as an application specific integrated circuit (ASIC), that is a processor having a dedicated circuit configuration designed to perform a specific process, in addition to the CPU that is a general-purpose processor which executes software (programs) to function as various processing units as described above.

One processing unit may be configured by one of the various processors or a combination of two or more processors of the same type or different types (for example, a combination of a plurality of FPGAs or a combination of a CPU and an FPGA). Further, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured using one or more of the various processors as a hardware structure.

In addition, specifically, an electric circuit (circuitry) obtained by combining circuit elements, such as semiconductor elements, can be used as the hardware structure of the various processors.

Further, in the above-described embodiment, the aspect in which the image processing program 63 is stored (installed) in the storage unit 62 in advance has been described. However, the present disclosure is not limited thereto. The image processing program 63 may be recorded on a recording medium, such as a compact disc read only memory (CD-ROM), a digital versatile disc read only memory (DVD-ROM), or a universal serial bus (USB) memory, and then provided. In addition, the image processing program 63 may be downloaded from an external device through a network.

What is claimed is:

1. An image processing device comprising:
   an input device;
   a display; and
   at least one processor,
   wherein the processor detects a faint calcification from a radiographic image captured by irradiating a breast with radiation and displays, on the display, a calcification distribution image showing a distribution of the faint calcification in the breast in the radiographic image in a manner in which (i) the calcification distribution image is superimposed on a blank region of the radiographic image and (ii) the display can be switched between showing the radiographic image and showing the calcification distribution image in response to an instruction from the input device.

2. The image processing device according to claim 1, wherein the faint calcification is a calcification having a diameter equal to or less than 0.24 mm.

3. The image processing device according to claim 2, wherein the calcification distribution image is a gray scale image or a binary image.

4. The image processing device according to claim 2, wherein the processor detects a small calcification from the radiographic image and displays the detected small calcification on the calcification distribution image.

5. The image processing device according to claim 2, wherein the processor detects at least one of a skin line or a nipple of the breast from the radiographic image and displays the detected at least one of the skin line or the nipple on the calcification distribution image.

6. The image processing device according to claim 2, wherein the processor detects a skin line and a nipple of the breast from the radiographic image, generates a plurality of pseudo-mammary gland lines indicating a mammary gland structure of the breast in a pseudo manner on the basis of the detected skin line and nipple, and displays the pseudo-mammary gland lines on the calcification distribution image.

7. The image processing device according to claim 2, wherein the processor determines a shape of the calcification from the radiographic image and displays a determination result on the calcification distribution image.

8. The image processing device according to claim 1, wherein the calcification distribution image is a gray scale image or a binary image.

9. The image processing device according to claim 1, wherein the processor detects a small calcification from the radiographic image and displays the detected small calcification on the calcification distribution image.

10. The image processing device according to claim 9, wherein a diameter of the faint calcification is smaller than a diameter of the small calcification.

11. The image processing device according to claim 10, wherein the small calcification is a calcification having a diameter that is greater than 0.24 mm and equal to or less than 1.00 mm.

12. The image processing device according to claim 9, wherein the small calcification is a calcification having a diameter that is greater than 0.24 mm and equal to or less than 1.00 mm.

13. The image processing device according to claim 1, wherein the processor detects at least one of a skin line or a nipple of the breast from the radiographic image and displays the detected at least one of the skin line or the nipple on the calcification distribution image.

14. The image processing device according to claim 1, wherein the processor detects a skin line and a nipple of the breast from the radiographic image, generates a plurality of pseudo-mammary gland lines indicating a mammary gland structure of the breast in a pseudo manner on the basis of the detected skin line and nipple, and displays the pseudo-mammary gland lines on the calcification distribution image.

15. The image processing device according to claim 1, wherein the processor determines a shape of the calcification from the radiographic image and displays a determination result on the calcification distribution image.

16. An image processing method executed by a computer, the image processing method comprising:
   detecting a faint calcification from a radiographic image captured by irradiating a breast with radiation; and
   displaying, on a display, a calcification distribution image showing a distribution of the faint calcification in the breast in the radiographic image in a manner in which (i) the calcification distribution image is superimposed on a blank region of the radiographic image, of and (ii) the display can be switched between showing the radiographic image and showing the calcification distribution image in response to an instruction from an input device.

17. A non-transitory computer-readable storage medium storing an image processing program that causes a computer to execute a process comprising:
   detecting a faint calcification from a radiographic image captured by irradiating a breast with radiation; and
   displaying, on a display, a calcification distribution image showing a distribution of the faint calcification in the breast in the radiographic image in a manner in which (i) the calcification distribution image is superimposed on a blank region of the radiographic image and (ii) the display can be switched between showing the radiographic image and showing the calcification distribution image in response to an instruction from an input device.

* * * * *